United States Patent
Buschmann (10) Patent No.: US 9,912,912 B2
(45) Date of Patent: Mar. 6, 2018

(54) CAMERA UNIT FOR A MOTOR VEHICLE (75) Inventor: Gerd Buschmann, Velbert (DE)

(73) Assignee: HUF HULSBECK & FURST GMBH & CO. KG, Velbert (DE)

(*) Notice: Subject to any disclaimer, the term of this patent is extended or adjusted under 35 U.S.C. 154(b) by 717 days.

(21) Appl. No.: 13/822,476

(22) PCT Filed: Aug. 24, 2011

(86) PCT No.: PCT/DE2011/050027
§ 371 (c)(1),
(2), (4) Date: May 21, 2013

(87) PCT Pub. No.: WO2012/037930
PCT Pub. Date: Mar. 29, 2012

(65) Prior Publication Data
US 2013/0235204 A1 Sep. 12, 2013

(30) Foreign Application Priority Data
Sep. 24, 2010 (DE) .................. 10 2010 046 396

(51) Int. Cl.
H04N 7/18 (2006.01)
B60R 11/04 (2006.01)
B60R 11/00 (2006.01)

(52) U.S. Cl.
CPC ............ H04N 7/18 (2013.01); B60R 11/04 (2013.01); B60R 2011/0094 (2013.01)

(58) Field of Classification Search
CPC ........................................... H04N 7/18
See application file for complete search history.

(56) References Cited

U.S. PATENT DOCUMENTS 6,480,103 B1* 11/2002 McCarthy ............... B60Q 3/06
340/425.5
7,029,057 B2* 4/2006 Izabel ...................... B60J 5/101
296/146.1
(Continued)

FOREIGN PATENT DOCUMENTS

DE 10 2006 048 371 A1 4/2008
DE 10 2006 048373 A1 4/2008
(Continued)

OTHER PUBLICATIONS

The International Search Report dated Dec. 5, 2012 for International Application No. PCT/DE2011/050027.

Primary Examiner — Mohammad J Rahman
(74) Attorney, Agent, or Firm — Quarles & Brady LLP (57) ABSTRACT Camera unit (3, 3') having a protective element (4, 4') for recording images of an external region for a motor vehicle (1), which camera unit is connected to a display apparatus, which is arranged within the motor vehicle (1), via a controller, wherein the camera unit (3, 3') is arranged within a recess (5, 5'), which is provided in the motor vehicle (1), such that it is covered by means of the protective element (4, 4') in an inactive operating position, and the camera unit (3, 3') and/or the protective element (4, 4') can be moved into an enable position, which serves as the active operating position for recording images of the external region, by a drive element after activation of a first operating element, in particular by the activation of the reverse gear, which is in the form of the first operating element, of the motor vehicle (1), and at least a second operating element (6, 6') is provided, wherein the camera unit (3, 3') and/or the protective element (4, 4') can be moved into the enable position which is suitable for recording images of the external region by the drive element after activation of the second operating (Continued)

element (6, 6'), wherein the second operating element (6, 6') can be operated by the user only outside the motor vehicle (1).

20 Claims, 8 Drawing Sheets (56) References Cited

U.S. PATENT DOCUMENTS

| | | | | |
|---|---|---|---|---|
| 2003/0102688 A1* | 6/2003 | Bingle | ............... | B60Q 3/06 296/76 |
| 2003/0137586 A1* | 7/2003 | Lewellen | ............... | H04N 7/181 348/148 |
| 2004/0036768 A1* | 2/2004 | Green | ............... | H04N 7/183 348/148 |
| 2004/0174042 A1* | 9/2004 | Izabel | ............... | B60J 5/101 296/146.8 |
| 2005/0222753 A1* | 10/2005 | Ishikawa | ............... | B60R 1/00 701/409 |
| 2007/0236364 A1* | 10/2007 | Hubbard | ............... | B60Q 9/005 340/932.2 |
| 2008/0100939 A1* | 5/2008 | Brester | ............... | B60R 1/0605 359/872 |
| 2010/0040361 A1* | 2/2010 | Schuetz | ............... | B60R 11/04 396/428 |
| 2011/0210151 A1* | 9/2011 | Weikert | ............... | B60R 11/04 224/309 |
| 2011/0211062 A1* | 9/2011 | Kamps | ............... | B60R 11/04 348/118 |
| 2011/0242303 A1* | 10/2011 | Giraud | ............... | E05B 81/78 348/77 |
| 2012/0007984 A1* | 1/2012 | Schütz | ............... | B60R 11/04 348/148 |

FOREIGN PATENT DOCUMENTS

| | | |
|---|---|---|
| DE | 102006048371 A1 | 4/2008 |
| DE | 102006048373 A1 | 4/2008 |
| DE | 10 2007 052401 A1 | 5/2009 |
| DE | 102007052401 A1 | 5/2009 |
| DE | 10 2008 059 918 A1 | 3/2010 |
| DE | 10 2008 059918 A1 | 3/2010 |
| DE | 102008059918 A1 | 3/2010 |

* cited by examiner

CAMERA UNIT FOR A MOTOR VEHICLE

CROSS-REFERENCE TO RELATED APPLICATIONS

This application represents the national stage entry of PCT International Application No. PCT/DE2011/050027 filed on Aug. 24, 2011, and claims the benefit of German patent application no. 10 2010 046 396.5 filed on Sep. 24, 2010. The disclosure of each of these applications is hereby incorporated by reference as if set forth in their entirety herein.

The invention relates to a camera unit having a protective element for recording images of an external region for a motor vehicle, which camera unit is connected via a control unit to a display device arranged within the motor vehicle, wherein, in an inactive operating position, the camera unit is arranged covered by means of the protective element within a recess provided on the motor vehicle, and, after activation of a first activation element, the camera unit and/or the protective element can be moved, in particular by the activation of the reverse gear, embodied as a first activation element, of the motor vehicle, by a drive element into a release position serving active operating position for recording images of the external region, and at least one second activation element is provided, wherein, after activation of the second activation element, the camera unit and/or the protective element can be moved by the drive element into the release position which is suitable for recording images of the external region.

Motor vehicles having a camera unit are widely known from the prior art. Camera unit for capturing the external region is usually located on the tailgate in order to facilitate parking of the motor vehicle for the user. However, it is to become apparent that the camera unit can be cleaned only at considerable cost if, when said camera unit is in an inactive state, it is located in a recess which is arranged on the tailgate and is covered by a protective element such as, for example, an emblem of the motor vehicle manufacturer. In motor vehicles which are disclosed in the prior art, the camera unit is extended into an active operating position by means of a drive element when a reverse gearspeed is engaged by a gearshift lever, to permit said camera unit to capture the external region arranged behind the motor vehicle. The external region captured by the camera unit is displayed in a display device arranged in the motor vehicle. During a subsequent gearspeed change, the camera unit is retracted back into the recess again within several seconds by means of the drive element. The camera unit is then in its inactive operating position again. For the driver of the motor vehicle it is not possible to exit the vehicle in order to clean the camera unit because the motor vehicle having an automatic transmission or a manual transmission would simply carry on moving without a motor vehicle driver (user) when a reverse gearspeed is engaged. When a reverse gearspeed is not engaged, the camera unit has an inactive operating position in which the camera unit is arranged covered in the recess by the protective element. Cleaning, repair or exchange of the camera unit are possible only at increased cost, requiring the protective element to be removed again.

Furthermore, in the prior art the laid-open patent application DE102009056346A1 is known which discloses an activation element within the motor vehicle. By using this activation element arranged within the vehicle it is possible to move the camera unit into its release position. However, a further activation element is provided for this purpose on the dashboard.

The object of the invention is to make available a motor vehicle having a camera unit in which the activation elements provided on the dashboard are reduced in order to improve visibility for the user within the passenger cell.

The object is achieved in that the second activation element can be activated by the user only outside the motor vehicle. This measure makes it possible to dispense with an additional activation element arranged on the dashboard. The overview on the dashboard is improved for the user. Furthermore, the manufacturing costs for the motor vehicle are reduced, in particular when it is possible to have recourse to already existing activation elements arranged outside the vehicle. Furthermore, it is possible to exchange or repair the camera unit independently of the gearspeed engaged. If the user of the motor vehicle recognizes on the display device within the motor vehicle when reversing that the visibility of the external region captured by the camera unit is adversely affected by particles of dirt, it is therefore possible for him to set the gearshift lever embodied as a first activation element to the parked position in the case of an automatic transmission or, in the case of a manual transmission, to set the gearshift lever embodied as a first activation element to the idling position and, if appropriate, to put on the handbrake, with the engine running or else with the engine in the stationary state, and for him to move the camera unit into a release position by means of the drive element after the second activation element has been activated. In the release position, the camera unit is in the active operating position in which the customary capturing of the external region is possible. However, in this active operating position the camera unit is also simultaneously in a position which is ideal and easily accessible for the user in order to clean the camera unit or, if appropriate, to change it within the scope of a repair. In its active operating position, the camera unit must necessarily be visible to the user because, in its active operating position, the camera unit must record images of the external region over a wide angle in order to display all the objects or persons arranged behind the vehicle to the user by means of the display device.

In one preferred embodiment of the invention there is provision that the camera unit and/or the protective element remain/remains in the release position by virtue of the activation of the second activation element by means of the drive element.

The essential advantage here is that the user has sufficient time to carry out the repair, the exchange or the cleaning of the camera unit.

In a further advantageous refinement of the subject matter of the invention there is provision that, when the second activation element is activated, the motor vehicle is in a quiescent state.

This measure ensures that the user who is cleaning the camera unit and who is located in front of or behind the motor vehicle is not accidentally knocked down by a motor vehicle driver of the motor vehicle. The safety requirements are advantageously improved by this measure.

The structural design is very simple and cost-effective if the drive element is embodied as an electric motor.

According to a further preferred embodiment of the invention there is provision that the drive element is embodied as a force accumulator. The force accumulator provides the advantage that electric current is dispensed with and as a result the power consumption of the motor vehicle is reduced. In addition, electronic components and lines are dispensed with, making the design simpler and more cost-effective. After the activation of the second activation element, the camera unit and/or the protective element are moved by the drive element into the active operating position by virtue of the fact that the force accumulator, embodied for example as a spring element, relaxes. This is followed by the cleaning, the exchange or the repair of the camera unit by the user. Subsequently, the camera unit and/or the protective element are/is moved back into the inactive operating position as a result of the manual activation of the second activation element by the user. In the process, the force accumulator is prestressed again. In this procedure, there is a saving in energy and cleaning is possible independently of the state of charge of the motor vehicle battery.

In a further advantageous refinement of the subject matter of the invention there is provision that the second activation element is arranged on a door or flap, in particular on a tailgate.

According to a further refinement of the subject matter of the invention there is provision that the second activation element is embodied as a rear activator which serves to open the tailgate. The significant advantage is that an additional component, in particular on the dashboard, is dispensed with in a cost-effective way. On the one hand, the rear activator has the function of opening and/or closing the tailgate and, on the other hand, the rear activator performs the function of the second activation element, specifically moving the camera unit into its active or inactive operating position after the activation of said activation element. This also simplifies the structural design of the camera unit because two functions are assigned to one component, in particular the second activation element. Additional activation elements are dispensed with in a cost-effective way. The control unit which, under a certain circumstance, is already present must merely be provided with new software.

The structural design is very simple and cost-effective if the protective element is embodied as a second activation element. With this solution there is also the advantage that an additional component is dispensed with because, on the one hand, the protective element protects the camera unit against damage and, on the other hand, the protective element performs the function of the second activation element. In addition, the protective element can also be provided with an emblem of a motor vehicle manufacturer.

According to a further embodiment there is provision that the second activation element is embodied as a pushbutton key on a mobile radio key which is assigned to the motor vehicle. This measure makes it possible to activate the drive element even from a location which is remote from the motor vehicle, in order to move the camera unit into the active operating position by means of the drive element. As a result, when the user arrives in front of the camera unit the latter is already in its release position, with the result that the user can start with the cleaning, the exchange or the repair directly. In this context, it is also advantageous if the pushbutton key has a corresponding symbol, for example a camera, on the radio remote control. However, it is also possible to provide the pushbutton key for opening the tailgate on the radio remote control with the function of the second activation element.

According to a further preferred embodiment of the invention there is provision that, in order to activate the drive element, it is necessary to press the second activation element for at least one to two seconds. If two functions are assigned to the second activation element, this measure rules out the possibility of both functions which are assigned to the activation element being triggered simultaneously. As a result, when the second activation element, which is embodied, for example, as a rear activator, is activated, a movement of the camera unit into the active operating position is prevented by means of the drive element. This is desirable if the user would like to carry out a deliberate action, in particular if the user does not have any need to clean or repair the camera unit but instead would merely like to open the tailgate by means of the rear activator.

According to a subsequent preferred embodiment there is provision that the camera unit and/or the protective element can be moved back into the inactive operating position by the drive element as a result of the repeated activation of the second activation element. This offers the advantage that the user carries out a deliberate action. The user himself decides when precisely the process of cleaning or exchanging the camera unit is concluded, and the camera unit and/or the protective element are/is moved back again into the inactive operating position by the drive element.

According to a further embodiment of the invention there is provision that, after a predetermined time period, in particular after at least one to three minutes, without activation of the second activation element, the camera unit and/or the protective element can be moved back into the inactive operating position by the drive element. If the user forgets to move the camera unit and/or the protective element into its inactive operating position, the camera unit and/or the protective element is moved automatically to its inactive operating position without activation of the second activation element. Otherwise it would be possible that in its active operating position the camera unit is damaged during travel of the motor vehicle, in particular at an increased speed of the motor vehicle, by upwardly swirling stones and particles of dust because the camera unit is at least only partially covered by the protective element in the active operating state.

According to a further embodiment, there is provision that the camera unit can be moved automatically into its inactive operating position without activation of the second activation element when the tailgate closes. At least one sensor which detects the state of opening and/or state of closing of the doors, flaps and the like is generally assigned to the motor vehicle in order, for example, to indicate to the user that the doors or flaps, in particular the tailgate, is locked. If this sensor is used to actuate the drive element of the camera unit, it is possible to dispense with additional components. The closing process is also simplified further for the user if the user does not have to carry out any further action. When the tailgate closes, the camera unit is moved automatically back into the inactive operating position again.

For the user it is very convenient if the second activation element is embodied as a capacitive sensor, in particular as a capacitive foot switch, which is arranged in the tailgate or in the bumper. In this context, in a further preferred embodiment the camera unit is not moved into its release position until after a second activation of the capacitive foot switch. This has the advantage that within the scope of a deliberate action the user can decide whether he would like to open the tailgate or whether he would merely like to move the camera unit into its release position for the purpose of cleaning or repair.

The invention will be described in the figures with reference to two exemplary embodiments. In said figures.

Figure 1:
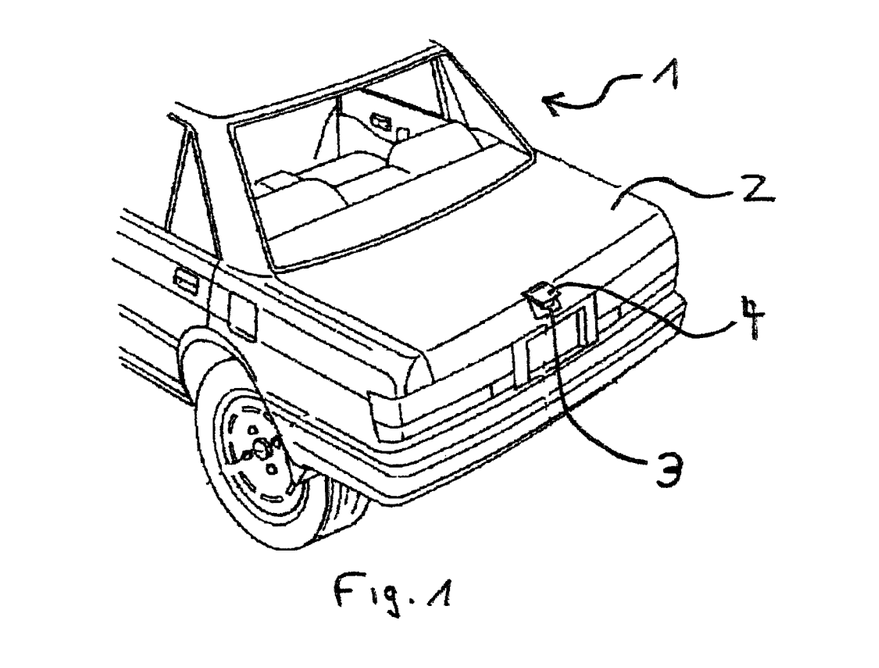
FIG. 1 shows a motor vehicle having a camera unit arranged in the tailgate.

FIG. 1 is a schematic view of a rear region of a motor vehicle 1 which is provided with a camera unit 3 which is arranged in a tailgate 2 and embodied as a reversing camera. The camera unit 3 comprises essentially an image sensor and an objective which are arranged in a housing. The image sensor is embodied as a CCD sensor in this exemplary embodiment. Basically, the camera unit 3 comprises the external region, wherein the camera unit 3 is connected via a control unit to a display device (not shown in the motor vehicle 1) which serves to display an external region arranged behind the motor vehicle 1. This makes the process of parking and leaving the parking space easier for the user since the user easily recognizes objects or persons behind the motor vehicle 1 if they are located outside the viewing region of the side mirrors and that of an interior mirror arranged within the vehicle 1. The camera unit 3 is assigned a protective element 4 which is mounted so as to be pivotable about a first axis 4.1 and which protects the camera unit 3 against damage and soiling by swirled-up particles of dust or stones during travel.

Figure 2:
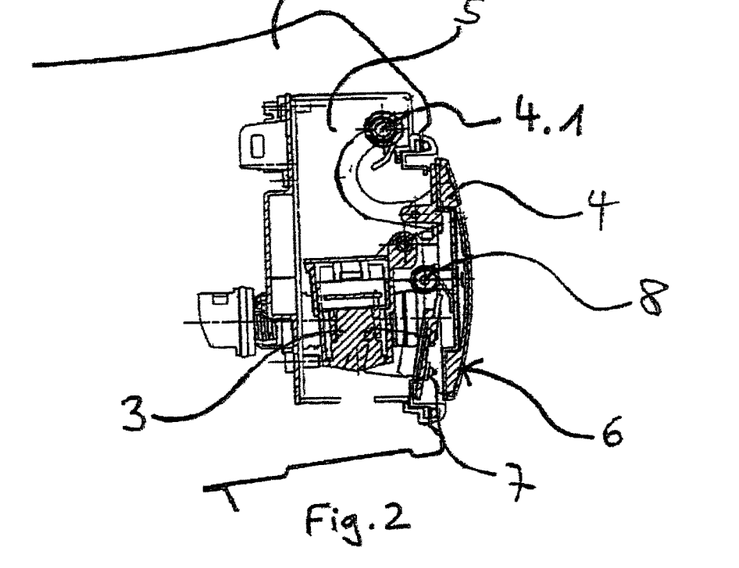
FIG. 2 shows a sectional view of the camera unit arranged in a recess of the tailgate, in an inactive operating position according to a first embodiment.

In FIG. 2, the camera unit 3 is shown in an inactive operating position.

In this context, the camera unit 3 is covered by the protective element 4 within a recess 5 arranged in the tailgate 2.

Figure 4:
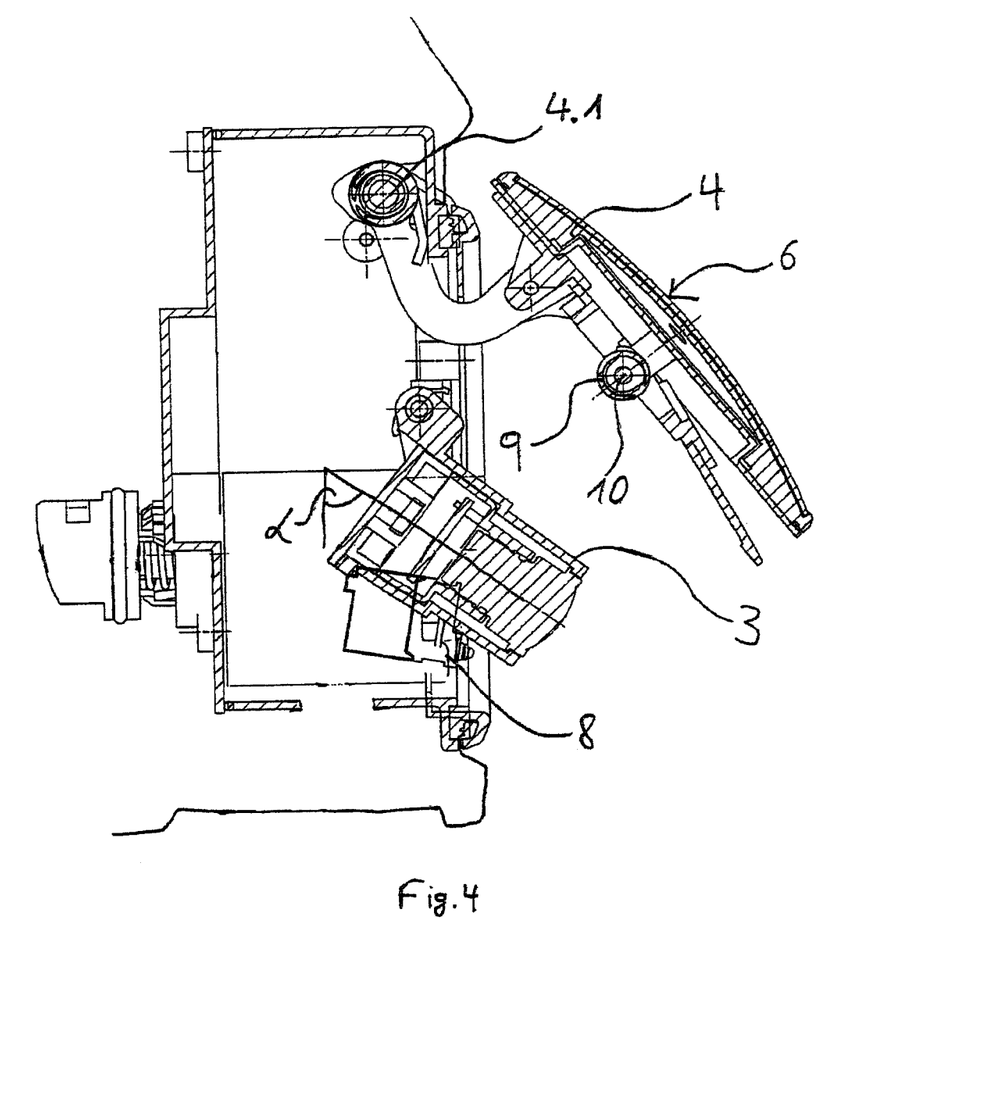
FIG. 4 shows a sectional view of the camera unit arranged in the recess of the tailgate, in an active operating position according to the first embodiment.
Figure 5:
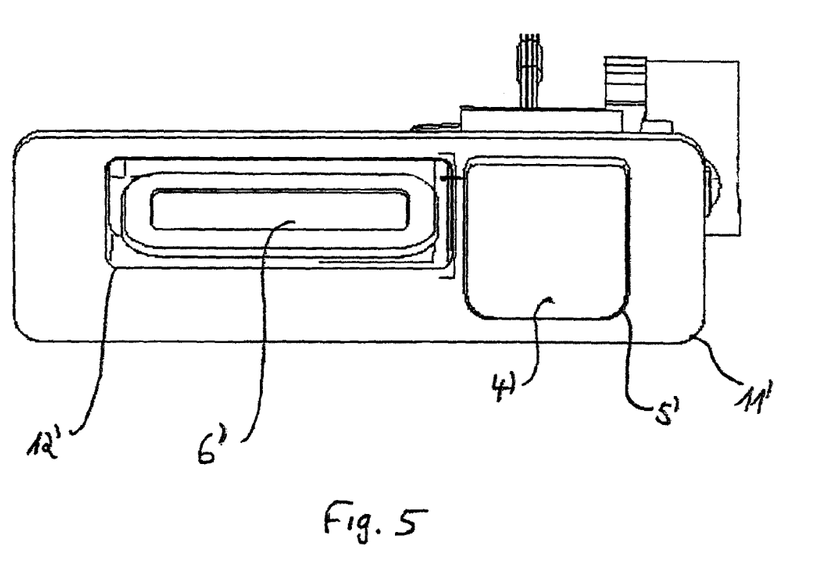
FIG. 5 shows a plan view of a module having a rear activator and a camera unit in an inactive operating position according to a second embodiment.
Figure 6:
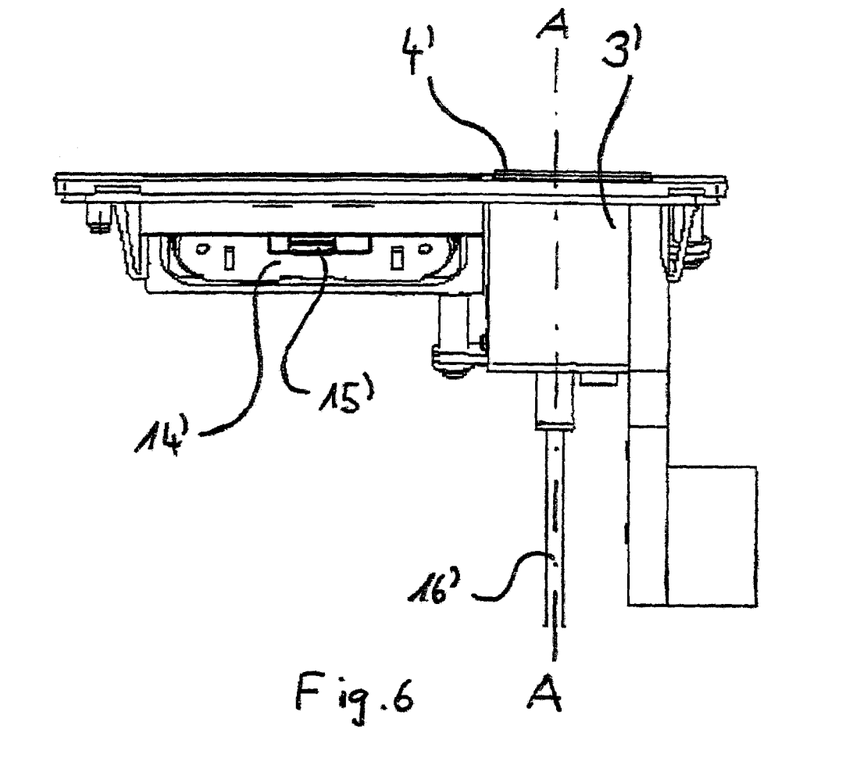
FIG. 6 shows a view of the module from below, comprising the camera unit in the inactive operating position according to the second embodiment.
Figure 7:
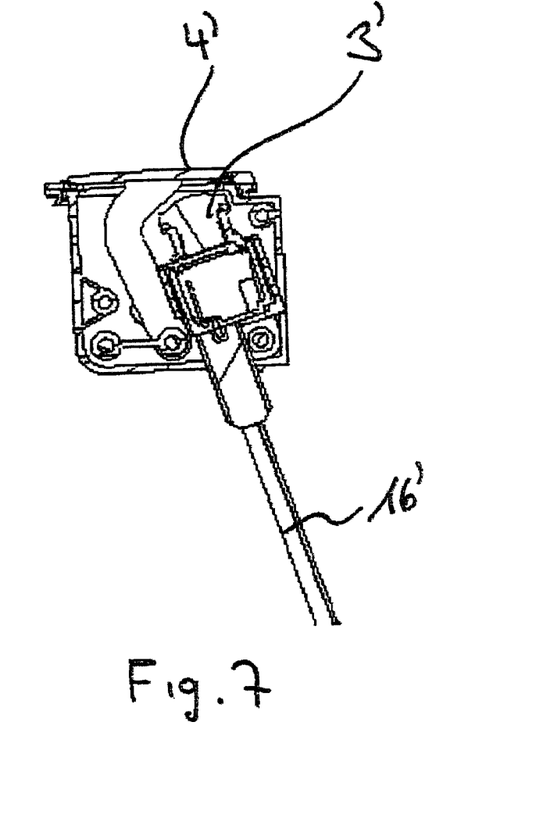
FIG. 7 shows a sectional view A-A of the camera unit in the inactive operating position according to the second embodiment.

An active operating position of the camera unit 3 is displayed in FIG. 4. In this context, the camera unit and the protective element 4 are activated by engaging a gearspeed by a drive element by means of a first activation element embodied as a gearshift lever. In this context, the drive element which is embodied as an electric motor moves the camera unit 3 and the protective element 4 into a release position for recording images of the external region arranged behind the motor vehicle 1, in order to avoid the motor vehicle 1 impacting against obstacles or persons during a parking process. The camera unit 3 and the protective element 4 are then in the active operating position. As shown in FIG. 4, the camera unit 3 projects out of the recess 5 at an inclined angle α. According to the invention, a second activation element 6 is provided which can be activated, in particular in the case of a stationary motor vehicle 1. The camera unit 3 is moved into the release position by the drive element as a result of the activation of the second activation element 6. This release position corresponds essentially to the release position which the camera unit 3 assumes after activation of the first activation element. In this release position, cleaning, exchange or repair of the camera unit 3 by the user are possible because the camera unit 3 is located in a position which is easily accessible for the user, as shown in FIG. 4. After the activation of the second activation element 6, the camera unit 3 does not always have to have an online operating status in which the external region records images and is displayed in the display device arranged in the vehicle. In this context, it is possible to differentiate between various cases. A case may occur in which during the parking process on the display device the user detects that the camera unit 3 is soiled. After the activation of the second activation element 6, the camera unit 3 is moved into the active operating position by means of the drive element and the user cleans the camera unit which is easily accessible to him and which projects out of the recess 5 at the angle α. However, in this context the camera unit 3 is still in the online operating mode and records images of the external region which then displays on the display device the user who is actually active during the cleaning process. Another case is if the user approaches a closed, parked motor vehicle 1 which is not operating. After activation of the second activation element 6, the camera unit 3 is then in an online operating mode, with the result that display of the external region in the display device is ruled out. As a result, the current is advantageously saved and the loading of the vehicle battery is reduced. However, it is alternatively also possible that in the last-mentioned case the camera unit 3 is always in the online operating mode after the activation of the second activation element.

Figure 3:
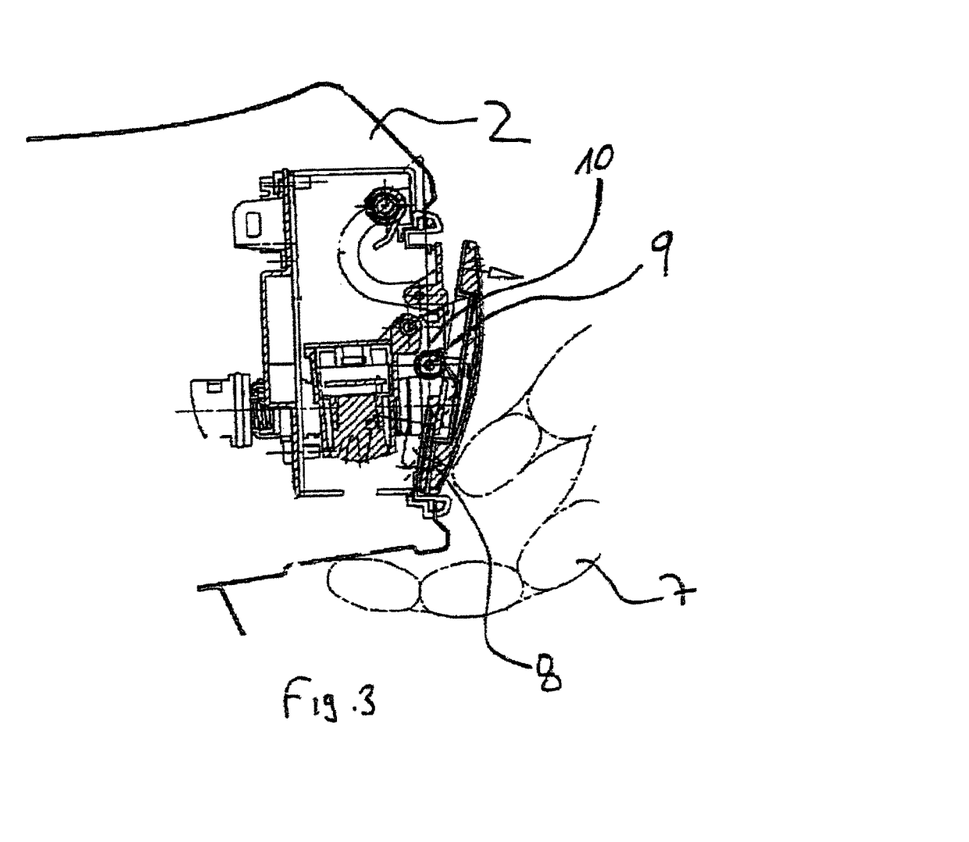
FIG. 3 shows a sectional view of the camera unit arranged in a recess in the tailgate, when a second activation element is activated according to the first embodiment.

As is apparent in FIGS. 2 to 4, in the present exemplary embodiment the second activation element 6 is embodied as a protective element 4, wherein the protective element 4 serves at the same time as a rear activator for opening and/or closing the tailgate. Alternatively it is possible that the second activation element 6 is embodied as a pushbutton key on a mobile radio key which is assigned to the motor vehicle 1. Likewise, there is the further alternative possibility of arranging the second activation element 6 on a dashboard of the motor vehicle 1.

As is apparent in FIG. 3, the activation of the second activation element 6 by a user's hand 7 causes a microswitch 8 which is embodied as an electronic switching element to be activated, said microswitch 8 activating the drive element via a control unit in order to move the camera unit 3 into the active operating position. However, the microswitch 8 which is arranged on the housing of the camera unit 3 also serves at the same time to trigger an electromechanical lock unit comprising at least one retaining pawl and one rotary latch which are operatively connected to a closing element arranged on the motor vehicle 1. If the closing unit is triggered by means of the microswitch 8, the opening process of the tailgate 2 takes place, and the user can lift up the tailgate 2 manually for the purpose of opening. So that continuous activation of the microswitch 8 by the second activation element 6 is avoided, the protective element 4 which is embodied as a second activation element 6 is mounted by means of a spring element 9 so as to be pivotable about a second axis 10. The protective element 4 is therefore moved back again into its home position after its activation by means of the restoring force generated by the spring element 9. It is also theoretically possible for the second microswitch 8 to have to be activated for two seconds by means of the second activation element 6 within the scope of a deliberate action, in particular in the case of a stationary motor vehicle 1, in order to move the camera unit 3 and the protective element 4 into the active and/or inactive operating position. After the activation of the second activation element 6, the camera unit 3 remains in the active operating position (see FIG. 4) by means of the drive element, with the result that cleaning or repair of the camera unit 3 is possible without difficulty. The camera unit remains in the active operating position until the second activation element 6 is repeatedly activated. If the second activation element 6 is not repeatedly activated, the camera unit 3 is moved back into the inactive operating position again independently by means of the drive element after a predetermined time period, in particular after a minute, automatically without the second activation element 6 being activated by the user. However, the time period can also be between a minute and three minutes. The time period should in all cases be selected such that there is sufficient time to clean the camera unit 3. In the case of repair or exchange of the camera unit 3, for example in the case of inspection in a workshop, the time period is input manually by means of a mobile input device which is assigned to the motor vehicle 1 or arranged in the motor vehicle 1, with the result that the camera unit 3 remains in its release position for the duration of the repair. However, the camera unit 3 can also be moved back into its inactive operating position again manually from its release position by the user by pressing the protective element 4 if the user would like to protect the camera unit 3 again completely by the protective element 4 immediately after the cleaning process. It would be conceivable in this context for the microswitch 8, which triggers the operation of the drive element via the control unit, to be activated. In this case, the microswitch 8 could alternatively be arranged on the protective element 4. Owing to the activation of the microswitch 4 by means of the protective element 4 by the user, the camera unit 3 would then be moved back again into the inactive operating position with the aid of the drive element. The protective element 4 would then again be located in front of the camera unit 3 arranged in the recess 5.

Figure 8:
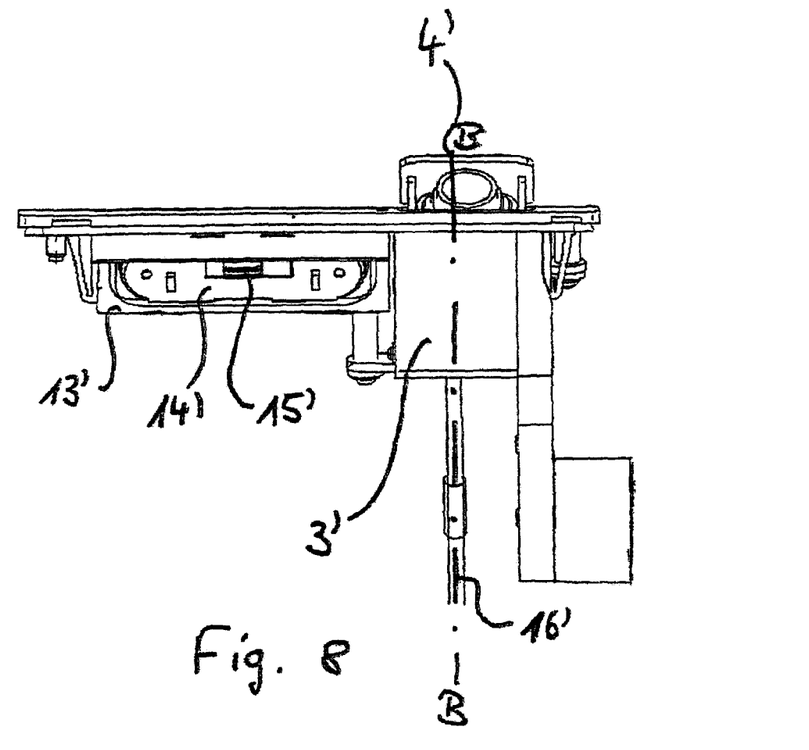
FIG. 8 shows a view of the module from below, having the camera unit in an active operating position according to the second embodiment.
Figure 9:
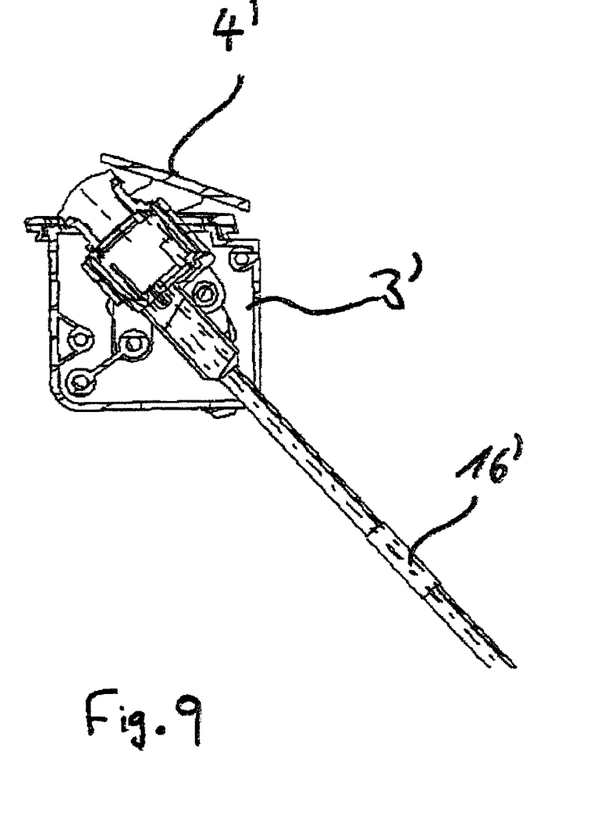
FIG. 9 shows a sectional view B-B of the camera unit according to the second embodiment in the active operating position.

FIGS. 5 to 9 show a second exemplary embodiment of the invention which has a similar method of functioning to the first exemplary embodiment. In the second exemplary embodiment the camera unit 3' is located in a housing 11' which is embodied as a module, wherein the module is arranged in a recess (not shown) in the tailgate 2 of the motor vehicle 1. The camera unit 3' is located in a first recess 5' and is covered by a protective element 4' in the inactive operating position. The protective element 4' is in turn mounted so as to be pivotable by means of an axis and is mechanically connected to the camera unit 3'. The module has a second recess 12' in which a second activation element 6', embodied as a rear activator for opening the tailgate 2, is arranged. The rear activator comprises essentially a rear activator housing 13' which is embodied a receptacle shell 14' for a microswitch (not shown). The receptacle shell 14' has through-openings which serve to feed through the electrical leads 15' which connect the microswitch to control electronics (not shown). The camera unit 3' is also connected to the control electronics via an electrical lead 16'. Arranged within the tailgate 2 is a lock unit with a sensor which is embodied as a microswitch and which senses the locked state and respective opened state of the closing unit and passes them onto the control electronics. The control electronics are programmed in the present exemplary embodiment in such a way that when the second activation element 6' is activated the tailgate 2 opens and the camera unit 3' is moved into the active operating position. In this context the microswitch which is arranged in the rear activator housing is activated by means of the second activation element 6'. After the activation of the microswitch, the control electronics receive the signal that the tailgate is to be opened and said control electronics actuate the lock unit. The lock unit is changed from a locked state into an opened state so that the tailgate 2 can change from the closed position into an open position. In this context, the sensor of the lock unit senses that the latter is in an open state. This signal which is sensed by the sensor of the lock unit is passed on to the control electronics. If the control electronics have sensed the opened state of the lock unit, the drive unit of the camera unit 3' is actuated by the control unit, and the camera unit 3' is moved into the active cleaning position by means of the drive element. The user can then clean the camera unit 3' without difficulty because the latter is easily accessible to it, as is shown in FIGS. 8 and 9. As has already been described with respect to the first exemplary embodiment, the camera unit 3' can alternatively not be moved into the active operating position until the user has pressed the rear activator for at least two seconds. The control electronics detect the deliberate action of the user and activate the drive element, which moves the camera unit 3' into the active operating position for the purpose of cleaning. During the activation which lasts two seconds it is not absolutely necessary for the tailgate 2 to open. After the cleaning process is concluded, the tailgate 2 is activated again manually by the user by virtue of the fact that he presses, for example, the tailgate 2 in the direction of the ground with his hand. The sensor of the lock unit senses the closed state of the lock unit and passes on the signal to the control electronics. The control electronics evaluate the signal and actuate the drive element of the camera unit 3'. The camera unit 3' is moved back into the inactive operating position, illustrated in FIGS. 6 and 7, by the drive element. A sensor which is arranged in the lock unit and known from the prior art is advantageously used to move the camera unit 3' into the active or inactive operating position. All that is necessary is to reprogram the control electronics. As a result, the camera unit 3' can be easily cleaned without difficulty and in a cost-effective way.

Alternatively it is also possible for a motor, which moves the tailgate 2 into the opened state and/or closed state, to be assigned to the tailgate 2. The motor is activated after activation of a motor activation element in order to actuate the motor. When the motor activation element is activated, the camera unit 3 is moved into an active or inactive operating position. It is also conceivable for the tailgate 2 to be opened or closed by means of a capacitive sensor arranged in a bumper or in the tailgate 2 and embodied as a foot switch. In this context, the user moves his foot underneath the bumper and/or into its direct surrounding area. The capacitive sensor detects the user's foot and passes on a signal to the control electronics. The control electronics actuate the drive element of the camera unit 3', and the camera unit 3' is moved into the active or inactive operating position. The capacitive sensor can also be used to move the tailgate 2 into an open/closed position. Therefore the tailgate 2 can be moved here by means of a drive element which is embodied as a motor or force accumulator.

In addition, further refinements of the subject matter of the invention are possible with the result that the drive element is embodied as a force accumulator, in particular as a spring element. The electric motor and the force accumulator can also form the drive element together. It is also possible for the camera unit 3 to be arranged in a rigid and nonmovable fashion in the recess, with the result that the protective element 4 can be moved into an active or inactive operating position in order to move the camera unit 3 into the release position for capturing the external region. A further possibility is for the housing of the camera unit 3 to be embodied as a protective element 4. However, the camera unit 3 can also be embodied so as to be pivotable out of the recess 5 arranged in the tailgate 2. Alternatively it would also be possible for the camera unit 3 to be pivotable out of the recess 5 arranged in a front and/or rear bumper. Instead of the microswitch 8, a capacitive sensor could also be used which is arranged on the protective element 4. In this context, the camera unit can be designed in such a way that it cannot be moved into its release position until after a second activation of the capacitive foot switch.

LIST OF REFERENCE NUMERALS

1 Motor vehicle
2 Tailgate
3, 3' Camera unit
4, 4' Protective element
4.1 First axis
5, 5' Recess
6, 6' Second activation element
7 User's hand
8 Microswitch
9 Spring element
10 Second axis
11' Housing
12' Second recess
13' Rear activator housing
14' Receptacle shell
15' Electrical leads

The invention claimed is:

1. A camera unit assembly for recording images of an external region of a motor vehicle, which camera unit is connected via a control unit to a display device arranged within the motor vehicle, said camera unit comprising:
   a camera unit;
   a protective element, at least one of the camera unit and the protective element having an inactive operating position and a release position, in the inactive operating position, the protective element covers the camera unit within a recess formed in a motor vehicle, and in the active operating position, the protective element is clear of the camera unit allowing the camera unit to record images of an external region of the motor vehicle;
   a first activation element activating movement of the at least one of the camera unit and the protective element between the inactive operating position and the release position, the first activation element activated by a reverse gear of the motor vehicle in a drive state;
   a drive element activated by the first activation element and moving the at least one of the camera unit and the protective element between the inactive operating position and the release position; and
   at least one second activation element, the second activation element activating said drive element moving the camera unit between the inactive operating position and the release position suitable for capturing images of an external area of the vehicle only after a repeated activation of the second activation element from a user only outside the motor vehicle, and when the vehicle is in an inactive state.

2. The camera unit assembly as claimed in claim 1, in which the camera unit remains in the release position as a result of the repeated activation of the at least one second activation element.

3. The camera unit assembly as claimed in claim 1, in which the drive element is an electric motor.

4. The camera unit assembly as claimed in claim 1, in which the drive element includes a force accumulator urging the at least one of the camera unit and the protective element between the inactive operating position and the release position.

5. The camera unit assembly as claimed in claim 1, in which the at least one second activation element is arranged on a door or flap of the motor vehicle.

6. The camera unit assembly as claimed in claim 5, in which the at least one second activation element is a rear activator which serves to open a tailgate of the motor vehicle.

7. The camera unit assembly as claimed in claim 1, in which the protective element is the at least one second activation element.

8. The camera unit assembly as claimed in claim 7, in which the protective element is a rear activator which serves to open a tailgate of the motor vehicle.

9. The camera unit assembly as claimed in claim 1, in which the at least one second activation element is a pushbutton key on a mobile radio key assigned to the motor vehicle.

10. The camera unit assembly as claimed in claim 1, in which at least one of the camera unit and the protective element moves into the inactive operating position by the drive element as a result of repeated activation by the user of the at least one second activation element.

11. The camera unit assembly as claimed in claim 1, in which, after a predetermined time period, without activation of the at least one second activation element, at least one of the camera unit and the protective element automatically moves into the inactive operating position by the drive element.

12. The camera unit assembly as claimed in claim 1, in which at least one of the camera unit and the protective element automatically moves into the inactive operating position without activation of the at least one second activation element when a tailgate of the motor vehicle closes.

13. The camera unit assembly as claimed in claim 1, in which the at least one second activation element is a capacitive sensor arranged in at least one of a tailgate and a bumper of the motor vehicle.

14. A camera unit assembly for recording images of an external region of a motor vehicle, which camera unit is connected via a control unit to a display device arranged within the motor vehicle, said camera unit comprising:
   a camera unit;
   a protective element, at least one of the camera unit and the protective element having an inactive operating position and a release position, in the inactive operating position, the protective element covers the camera unit within a recess formed in a motor vehicle, and in the active operating position, the protective element is clear of the camera unit allowing the camera unit to record images of an external region of the motor vehicle;
   a first activation element activating movement of the at least one of the camera unit and the protective element between the inactive operating position and the release position, the first activation element activated by a reverse gear of the motor vehicle in a drive state;
   a drive element activated by the first activation element and moving the at least one of the camera unit and the protective element between the inactive operating position and the release position; and
   at least one second activation element, the second activation element activating said drive element moving the camera unit between the inactive operating position and the release position suitable for capturing images of an external area of the vehicle only after an activation of the second activation element by a user outside the motor vehicle wherein the activation of the second activation element exceeds a predetermined duration, and when the vehicle is in an inactive state.

15. The camera unit of claim 14, wherein the predetermined duration is one second.

16. The camera unit of claim 14, wherein the predetermined time duration is two seconds.

17. The camera unit of claim 14, wherein the at least one second activation element is a rear activator which serves to open a tailgate of the motor vehicle.

18. The camera unit of claim 14, wherein the at least one second activation element is a pushbutton key on a mobile radio key assigned to the motor vehicle.

19. The camera unit of claim 14, wherein the at least one second activation element is a capacitive sensor arranged in at least one of a tailgate and a bumper of the motor vehicle.

20. The camera unit of claim 14, wherein the protective element is the at least one second activation element.

\* \* \* \* \*